(12) United States Patent
Liao

(10) Patent No.: US 6,732,393 B1
(45) Date of Patent: May 11, 2004

(54) PRESS CONNECTING PLIERS FOR PINS

(75) Inventor: Chien-Chou Liao, Tu Cheng (TW)

(73) Assignee: Hanlong Ind. Co., Ltd. (TW)

( * ) Notice: Subject to any disclaimer, the term of this patent is extended or adjusted under 35 U.S.C. 154(b) by 2 days.

(21) Appl. No.: 10/390,620

(22) Filed: Mar. 19, 2003

(51) Int. Cl.⁷ .................... B26B 11/00; H01R 43/042
(52) U.S. Cl. ............ 7/158; 7/107; 7/129; 72/409.14; 29/751; 81/313; 81/363
(58) Field of Search ................ 7/158, 125, 129, 7/130, 131, 132, 133, 134, 107; 81/313, 314, 355, 361, 363; 72/409.01, 409.06, 409.08, 409.12, 409.14; 29/747, 748, 751, 753

(56) References Cited

U.S. PATENT DOCUMENTS

| | | | | |
|---|---|---|---|---|
| 2,875,655 A | * | 3/1959 | Lako | .................... 72/445 |
| 3,204,445 A | * | 9/1965 | Fila | .................... 72/409.08 |
| 3,328,872 A | * | 7/1967 | Reem | .................... 7/107 |
| 4,144,738 A | * | 3/1979 | Dziura et al. | ............ 72/409.08 |
| 5,042,286 A | * | 8/1991 | Wiebe et al. | ................. 72/414 |
| 5,934,137 A | * | 8/1999 | Tarpill | .................... 72/409.14 |
| 5,983,489 A | * | 11/1999 | Jee | .................... 29/751 |

* cited by examiner

Primary Examiner—Hadi Shakeri
(74) Attorney, Agent, or Firm—Bacon & Thomas, PLLC

(57) ABSTRACT

A pair of pin press-connecting pliers. The pliers include a first handle and a second handle pivot connected via a connecting seat. The first handle is provided on the inner side thereof with a guiding portion. A first press-connecting portion is provided in the guiding portion, and a linking member connects the first press-connecting portion with the second press-connecting portion. A second press-connecting portion is fixedly provided on the tailing end of the guiding portion via a die block. The connecting seat has at least a concave portion at the press connecting area of the first and the second handles for resting a wire thereon, and has a knife provided on a corresponding handle for peeling or cutting wire in cooperation with the concave portion.

10 Claims, 5 Drawing Sheets

PRESS CONNECTING PLIERS FOR PINS

BACKGROUND OF THE INVENTION

1. Field of the Invention

The present invention is related to a pair of pin press-connecting pliers, and especially to a pin press-connecting pliers structure for which the processing of pressing and assembling process are simplified to thereby reduce the cost of production. Particularly, a connecting seat can be provided at a pivot connecting end of a first handle with a second handle of the press connecting pliers to consolidate the press connecting pliers structure; the connecting seat has at least a concave portion at the press connecting area of the first handle and the second handle for resting of a wire thereon, and has a knife provided on a corresponding handle for peeling, cutting wire in cooperation with the concave portion, and the function of the pliers can be improved.

2. Description of the Prior Art

As shown in FIG. 1 depicting a conventional structure of a pair of pin press-connecting pliers, wherein the press connecting pliers comprises mainly a first handle B1 and a second handle B2; the first handle B1 is provided with a first die seat B3 and a second die seat B4. The second die seat B4 is fixedly provided on the tailing end of the first handle B1; the first die seat B3 is provided on the second handle B2 via a pusher rod B5, the other end of the pusher rod B5 is connected with the second handle B2 via a connecting rod B6; thereby when in use, the pin A2 and a wire A1 are fixedly placed on the first die seat B3 and the second die seat B4 respectively. By the press connecting action of the first handle B1 and the second handle B2, the connecting rod B6 moves the pusher rod B5 to move the first die seat B3 toward the second die seat B4, then pressing action of the first handle B1 and the second handle B2 makes press connecting of the pin A2 with the wire A1.

However, by virtue that the first handle B1 and the second handle B2 of the conventional pin press-connecting pliers are made of cast metal, and the pusher rod B5 and the first handle B1 must be provided therebetween a lining sleeve B7 to assure parallel sliding of the pusher rod B5, thereby the process of manufacturing of the entire press connecting pliers and assembling of the components are more complicated; and particularly, the entire press connecting pliers can only be used for pressing firm and connecting of the pin A2 to the wire A1, it is functionally insufficient in the practical line distribution of the pin A2 and the wire A1.

SUMMARY OF THE INVENTION

The pin press-connecting pliers of the present invention is constructed by providing a connecting seat at a pivot connecting end of a first handle with a second handle of the press connecting pliers, by providing a guiding portion on the inner side of the first handle, a first press-connecting portion in the guiding portion, a linking member effecting connection of the first press-connecting portion with the second handle, and a second press-connecting portion fixedly provided on the tailing end of the guiding portion via a die block; thereby, processing as well as assembling of the entire press connecting pliers can be simplified, and thereby the cost of production can be reduced. And the connecting seat has at least a concave portion at the press connecting area of the first handle with the second handle for resting of a wire thereon, and has a knife provided on a corresponding handle for peeling, cutting wire in cooperation with the concave portion, and the function of the pliers can be improved.

The present invention will be apparent after reading the detailed description of the preferred embodiment thereof in reference to the accompanying drawings.

DETAILED DESCRIPTION OF THE PREFERRED EMBODIMENT

Figure 1:
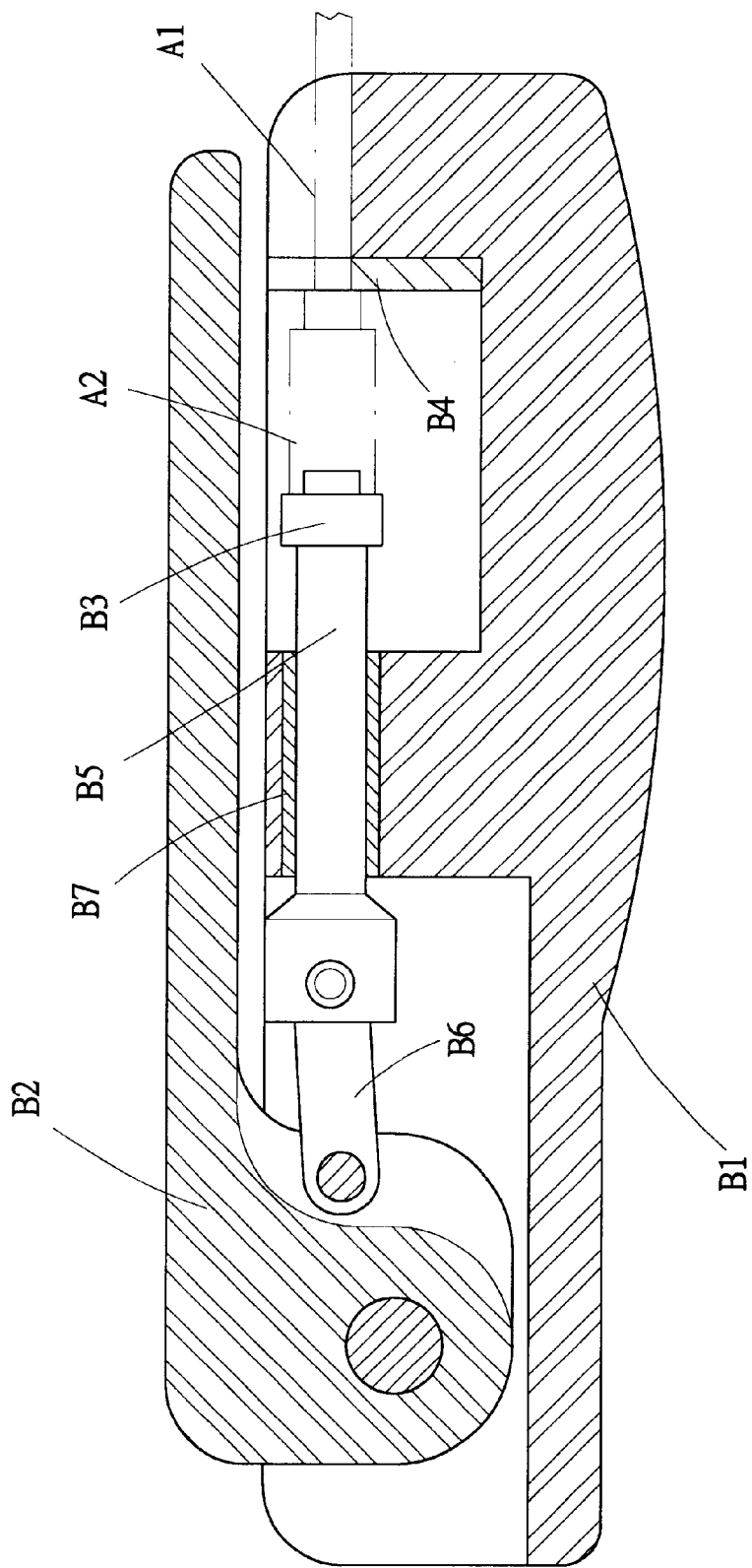
FIG. 1 is a sectional view showing the structure of a pair of conventional pin press-connecting piers.
Figure 2:
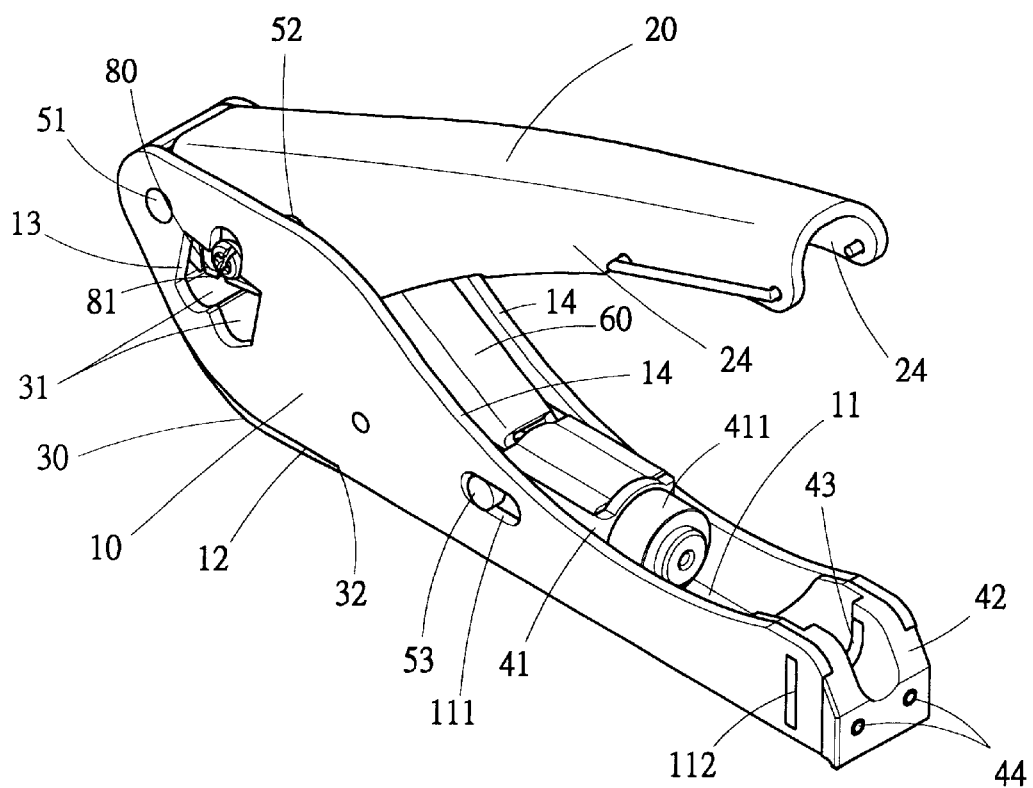
FIG. 2 is a perspective view showing the appearance of the press connecting plier structure of the present invention.
Figure 5:
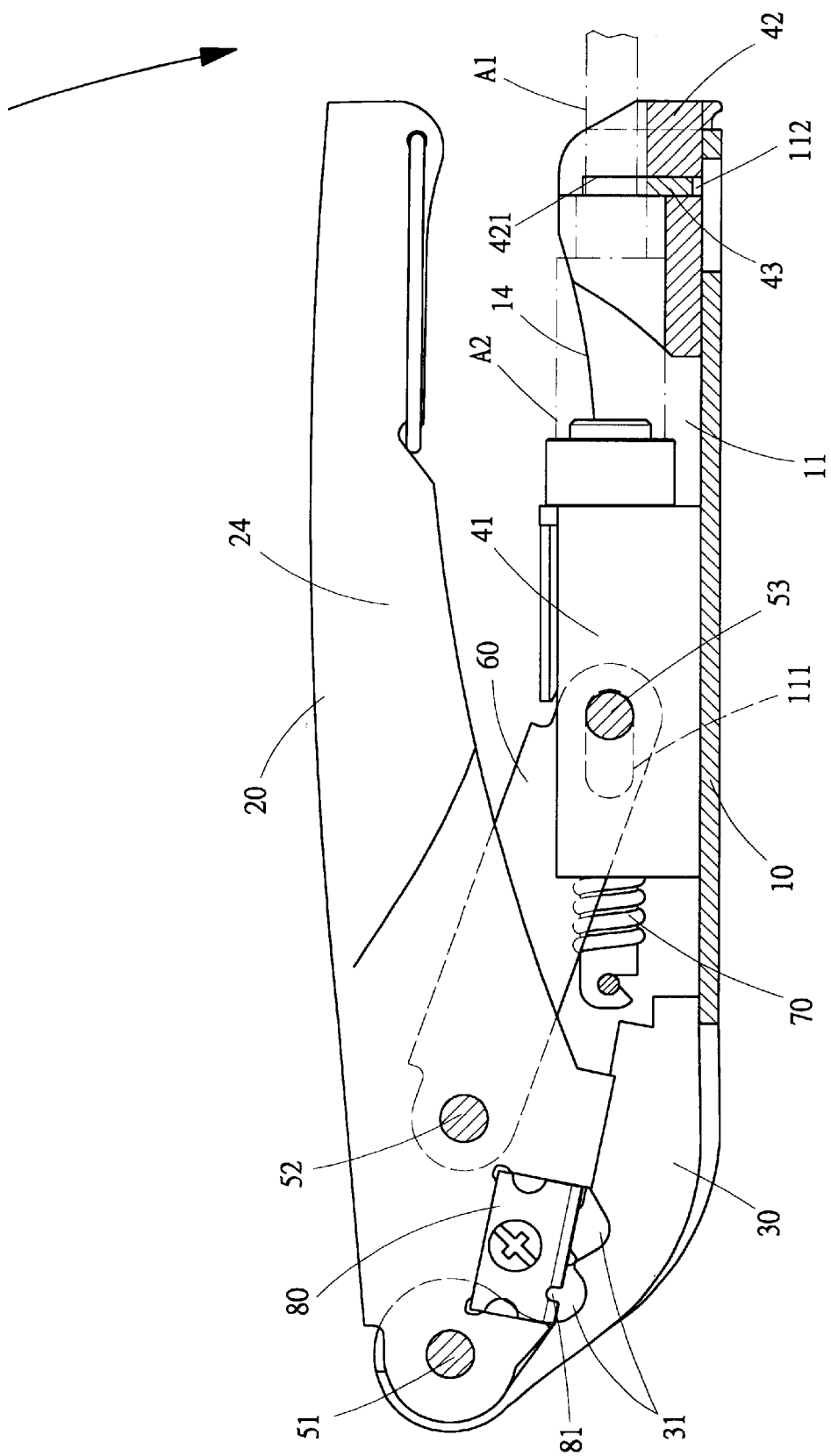
FIG. 5 is a sectional view showing the press connecting state of the first and the second handles of the present invention.

The structure of the pin press-connecting pliers of the present invention is comprised mainly of a first handle and a second handle 10, pivot connected with each other via a connecting seat such as is shown in FIG. 2; wherein the first handle 10 is provided on the inner side thereof with a guiding portion 11, a first press-connecting portion 41 is provided in the guiding portion 11, a second press-connecting portion 42 is fixedly provided on the tailing end of the guiding portion 11 of the first handle 10, and a linking,member 60 is provided between the first press-connecting portion 41 and the second handle 20; thereby when in use as is shown in FIG. 5, a pin A2 and a wire A1 are located respectively on the first press-connecting portion 41 and the second press-connecting portion 42, then the first and the second handles 10, 20 are pressed connected to each other, the linking member 60 pushes the first press-connecting portion 41 toward the second press-connecting portion 42, and by pressing of the first and the second press-connecting portions 41, 42, the pin A2 and the wire A1 are firmly press connected to each other.

Figure 3:
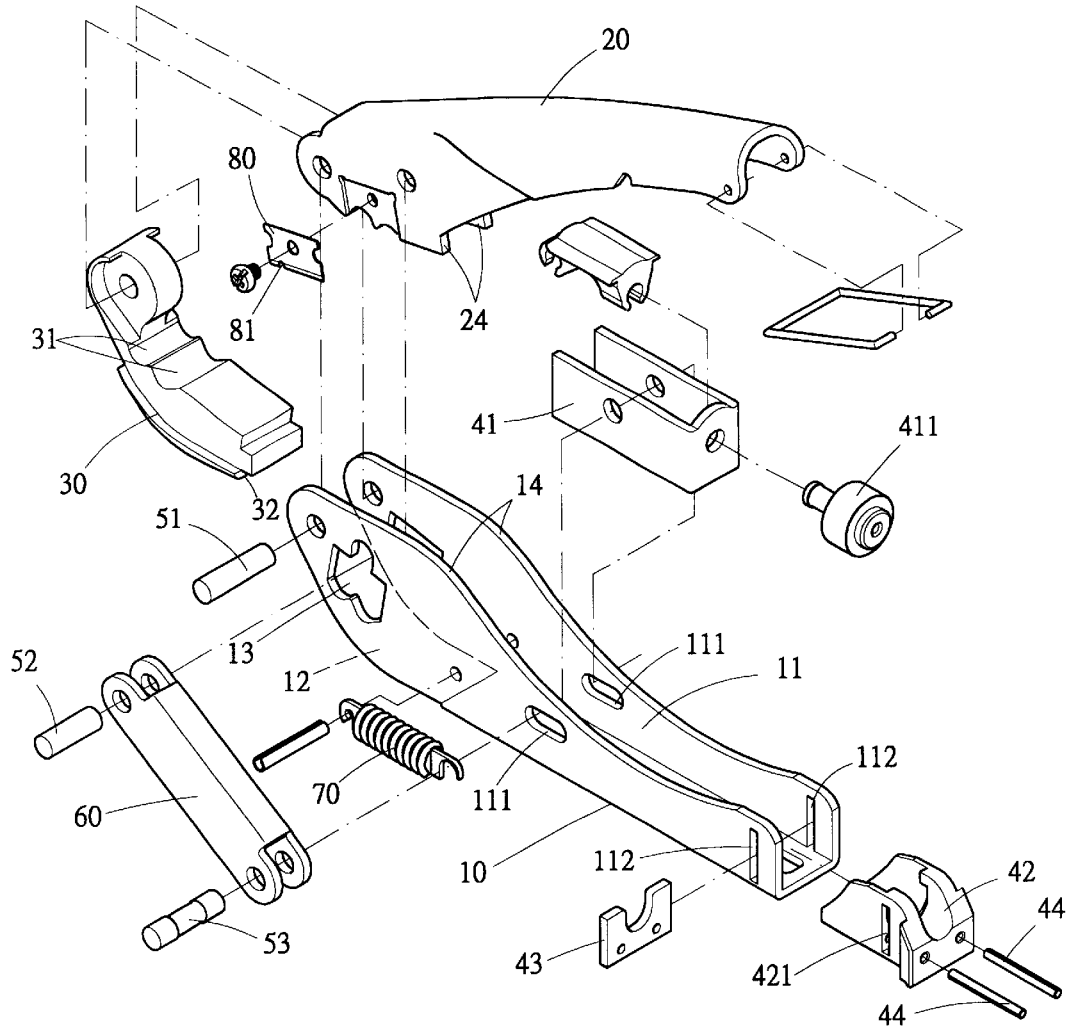
FIG. 3 is an analytical perspective view of the press connecting plier structure of the present invention.
Figure 4:
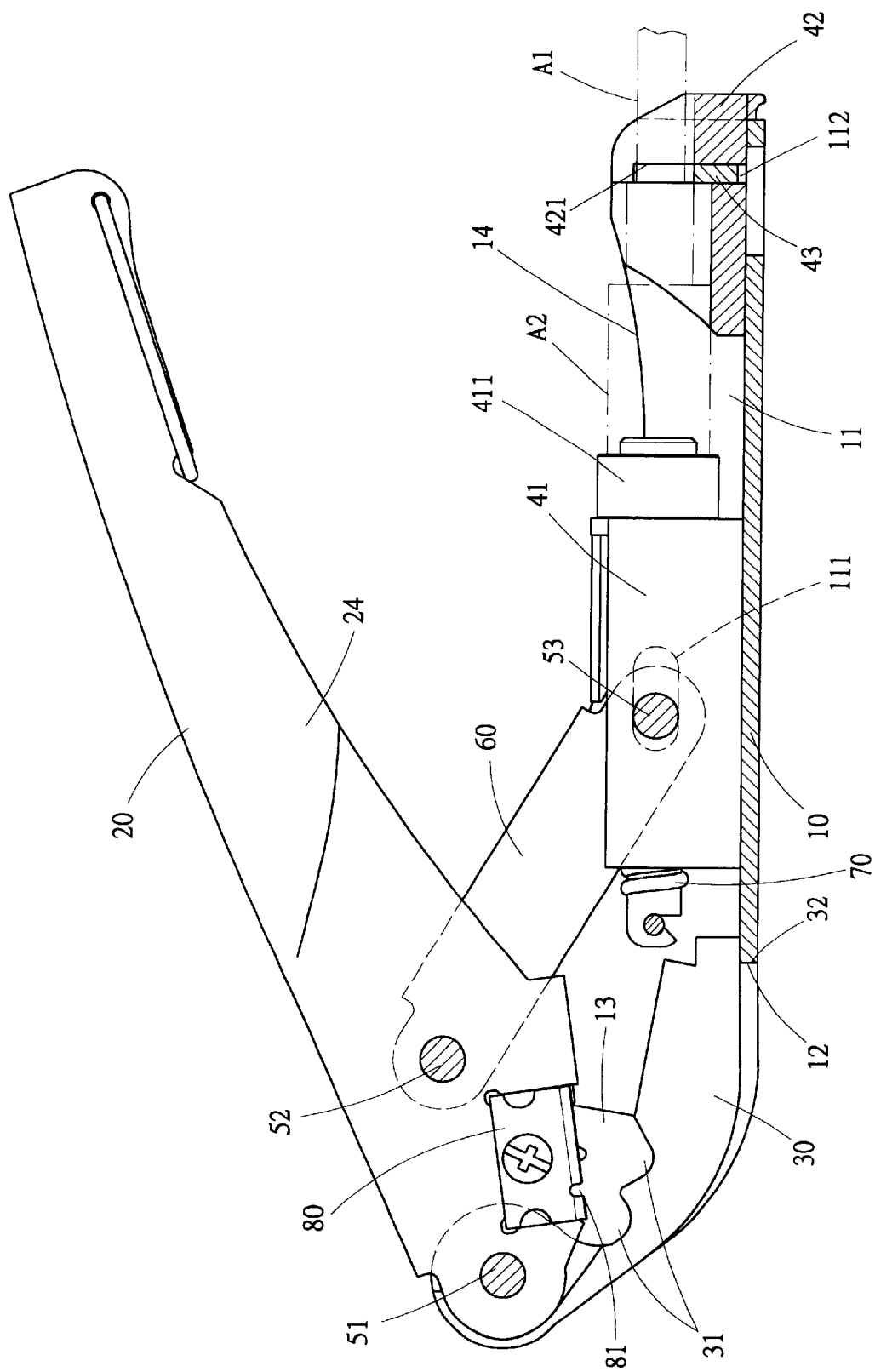
FIG. 4 is a sectional view showing the stretching out state of the first and the second handles of the present invention.

As shown in FIGS. 3 and 4, the pivot connecting ends of the first and the second handles 10, 20 are formed from two plates 14, 24 that are able to be overlapped and extended from the lateral sides of the handles 10, 20, the pivot connecting area of the first handle 10 has a notch 12 for fitting in of a connecting seat 30 of which the bottom has a step 32 able to engage with the edge of the plate at the notch 12. The step 32 and the notch 12 are engaged with each other to form a positioning function for the connecting seat 30, then a first axle pin 51 pivotally connects the first and the,second An handles 10, 20 and the connecting seat 30.

The guiding portion 11 of the first handle 10 is a channel similarly formed from the two plates 14, 24 extended from the lateral sides of the handles 10, 20 for fitting therein the first press-connecting portion 41; the first press-connecting portion 41 is a slide block and has a die seat 411 provided on an end in corresponding to the second press-connecting portion 42 for fitting in and positioning of the pin A2. The guiding portion 11 has a guiding slot 111 in the stroke of the first press-connecting portion 41; while the linking member 60 connecting the second handle 20 and the first press-connecting portion 41 is a structure of a link, one end of the linking member 60 is pivotally connected to the second handle 20 through a second axle pin 52, and the other end thereof is extended into the body of the first press-connecting portion 41 to connect with the guiding slot 111 of the guiding portion 11, the end of the linking member 60 is pivotally connected to the first press-connecting portion 41 by using a third axle pin 53 extending through the guiding slot 111. Thereby, the first press-connecting portion 41, the linking member 60 and the second handle 20 are connected with one another, and the guiding slot 111 makes a limitation against the third axle pin 53 and the first press-connecting portion 41; further, a restoring element 70 is provided between the first press-connecting portion 41 and the first handle 10 to effect restoration of the first press-connecting portion 41 to increase convenience of operation.

And more, the second press-connecting portion 42 is a seat capable of slipping in the tailing end of the guiding portion 11; a first insertion slot 112 and a second insertion slot 421 aligned with each other are provided at the slip bushing area of the guiding portion 11 over the second press-connecting portion 42, so that a die block 43 can be insertion fitted in the first insertion slot 112 and the second insertion slot 421 to make connection of the guiding portion 11 with the second press-connecting portion 42; then an insertion pin 44 is inserted to fix and position the die block 43. Thereby, the second press-connecting portion 42 can be fixedly provided on the tailing end of the guiding portion 11; and the die block 43 is for fixing the wire A1.

As shown in FIGS. 4 and 5, when in use of the entire press connecting pliers of the present invention, and under the state shown in FIG. 4 wherein the first and the second handles 10, 20 are in a stretching out state, the wire A1 and the pin A2 are located on the second press-connecting portion 42 and the first press-connecting portion 41 respectively. And as shown in FIG. 5, the first and the second handles 10, 20 are pressed to connected with each other, the linking member 60 pushes the first press-connecting portion 41 toward the second press-connecting portion 42; and by pressing of the first and the second press-connecting portions 41, 42, the pin A2 and the wire A1 are firmly press connected to each other.

By the fact that the first and the second handles 10, 20 are pivotally connected through the connecting seat 30 to get the feature of good structural strength and convenience for assembling, and as shown in FIGS. 2 and 3, the connecting seat 30, in addition to the function of consolidating the press-connecting pliers, is provided at the press-connecting area of the first with the second handles 10, 20 at least with a concave portion 31 for resting of the wire A1 thereon, the first handle 10 is provided on the plate thereof connecting with the connecting seat 30 with a hole 13 for extending therethrough the wire A1. And a knife 80 straddling the concave portions 31 of the connecting seat 30 is provided on the corresponding one of the handles 10, 20; and an indent 81 is provided at a position in opposition to one of the concave portions 31 to receive the core of the wire A1; the knife 80 is provided for peeling, cutting the wire A1 in cooperation with the concave portion 31, and the function of the pliers can be improved.

Accordingly, the pin press-connecting pliers of the present invention make their processing and assembling simplified, and have the function of peeling, cutting the wire.

The above specification and drawings are only for illustrating the present invention and not for giving any limitation to the scope of the present invention. It will be apparent to those skilled in this art that various modifications or changes without departing from the spirit of this invention shall also fall within the scope of the appended claims.

What is claimed is:

1. A pair of pin press-connecting pliers, comprising:

a first handle and a second handle pivotably connected with each other via a connecting seat, said first handle is provided on an inner side thereof with a guiding portion, a first press-connecting portion is provided in said guiding portion for fixing a pin, said guiding portion has a guiding slot in a connecting area with said first press-connecting portion, said guiding slot makes a limitation against said first press-connecting portion, and a linking member is connectably provided between said first press-connecting portion and said second handle;

a second press-connecting portion is fixedly provided on a tailing end of said guiding portion of said first handle for fixing a wire, thereby the structure of said pin press-connecting pliers for firmly press connecting is constructed, with which said pin and said wire are located respectively on said first press-connecting portion and said second press-connecting portion, when said first and the second handles are pressed connected to each other, said linking member pushes said first press-connecting portion towards said second press-connecting portion, and by pressing said first and second press-connecting portions, said pin and said wire are firmly press connected to each other; and wherein said connecting seat has at least a concave portion at a press connecting area of said first handle with said second handle for resting of a wire thereon, and has a knife straddling said concave portion of said connecting seat, and an indent is provided at a position in opposition to said concave portion to receive a core of said wire, said knife is provided for peeling, cutting said wire in cooperation with said concave portion.

2. The pair of pin press-connecting pliers as defined in claim 1, wherein pivot connecting ends of said first and second handles are formed from two plates able to be overlapped extended from lateral sides of said handles, a pivot connecting area of said first handle has a notch for fitting in of said connecting seat of which a bottom thereof has a step that is able to engage with an edge of said plate of said first handle at said notch; said step and said notch are engaged with each other to form a positioning function for said connecting seat, then a first axle pin pivotally connects said first and second handles and said connecting seat.

3. The pair of pin press-connecting pliers as defined in claim 1, wherein said first press-connecting portion is a slide block and has a die seat provided on an end corresponding to said second press-connecting portion for fitting in and positioning of said pin; while said linking member is a structure of a link; one end of said linking member is pivotally connected to said second handle through a second axle pin, and another end thereof is extended into a body of said first press-connecting portion to connect with said guiding slot of said guiding portion, the end of said linking member is pivotally connected to said first press-connecting portion by using a third axle pin extending through said guiding slot, thereby, said first press-connecting portion, said linking member and said second handle are connected with one another.

4. The pair of pin press-connecting pliers as defined in claim 1, wherein said second press-connecting portion is a seat capable of being received in the tailing end of said guiding portion; a first insertion slot and a second insertion slot aligned with each other are provided at a slip bushing area of said guiding portion over said second press-connecting portion, a die block thereby is insertion fitted in said first insertion slot and said second insertion slot to make connection of said guiding portion with said second press-connecting portion; then an insertion pin is inserted to fix and position said die block, said die block is used for fixing said wire.

5. The pair of pin press-connecting pliers as defined in claim 1, wherein a restoring element is provided between said first press-connecting portion and said first handle to effect restoration of said first press-connecting portion.

6. A pair of pin press-connecting pliers, comprising:

a first handle and a second handle pivotally connected with each other via a connecting seat, said first handle is provided on an inner side thereof with a guiding portion, a first press-connecting portion is provided in said guiding portion for fixing a pin, said guiding portion has a guiding slot in a connecting area with said first press-connecting portion, said guiding slot makes a limitation against said first press-connecting portion, and a linking member is connectably provided between said first press-connecting portion and said second handle;

a second press-connecting portion is fixedly provided on a tailing end of said guiding portion of said first handle for fixing a wire, thereby the structure of said pin press-connecting pliers for firmly press connecting is constructed, with which said pin and said wire are located respectively on said first press-connecting portion and said second press-connecting portion, when said first and the second handles are pressed connected to each other, said linking member pushes said first press-connecting portion towards said second press-connecting portion, and by pressing said first and second press-connecting portions, said pin and said wire are firmly press connected to each other; and wherein the pivot connecting ends of said first and second handles are formed from two plates able to be over-lappingly extended from lateral sides of said handles; said connecting seat has at least a concave portion at a press connecting area of said first handle with said second handle for resting of a wire thereon, said first handle is provided on said plate thereof connecting with said connecting seat with a hole for extending therethrough said wire and is provided on the corresponding one of said handles with a knife straddling said concave portion of said connecting seat, and an indent is provided at a position in opposition to said concave portion to receive a core of said wire, said knife is provided for peeling, cutting said wire in cooperation with said concave portion.

7. The pair of pin press-connecting pliers as defined in claim 6, wherein pivot connecting ends of said first and second handles are formed from two plates able to be overlapped extended from lateral sides of said handles, a pivot connecting area of said first handle has a notch for fitting in of said connecting seat of which a bottom thereof has a step that is able to engage with an edge of said plate of said first handle at said notch; said step and said notch are engaged with each other to form a positioning function for said connecting seat, then a first axle pin pivotally connects said first and second handles and said connecting seat.

8. The pair of pin press-connecting pliers as defined in claim 6, wherein said first press-connecting portion is a slide block and has a die seat provided on an end corresponding to said second press-connecting portion for fitting in and positioning of said pin; while said linking member is a structure of a link; one end of said linking member is pivotally connected to said second handle through a second axle pin, and another end thereof is extended into a body of said first press-connecting portion to connect with said guiding slot of said guiding portion, the end of said linking member is pivotally connected to said first press-connecting portion by using a third axle pin extending through said guiding slot, thereby, said first press-connecting portion, said linking member and said second handle are connected with one another.

9. The pair of pin press-connecting pliers as defined in claim 6, wherein said second press-connecting portion is a seat capable of being received in the tailing end of said guiding portion; a first insertion slot and a second insertion slot aligned with each other are provided at a slip bushing area of said guiding portion over said second press-connecting portion, a die block thereby is insertion fitted in said first insertion slot and said second insertion slot to make connection of said guiding portion with said second press-connecting portion; then an insertion pin is inserted to fix and position said die block, said die block is used for fixing said wire.

10. The pair of pin press-connecting pliers as defined in claim 6, wherein a restoring element is provided between said first press-connecting portion and said first handle to effect restoration of said first press-connecting portion.

* * * * *